Patented Feb. 12, 1924.

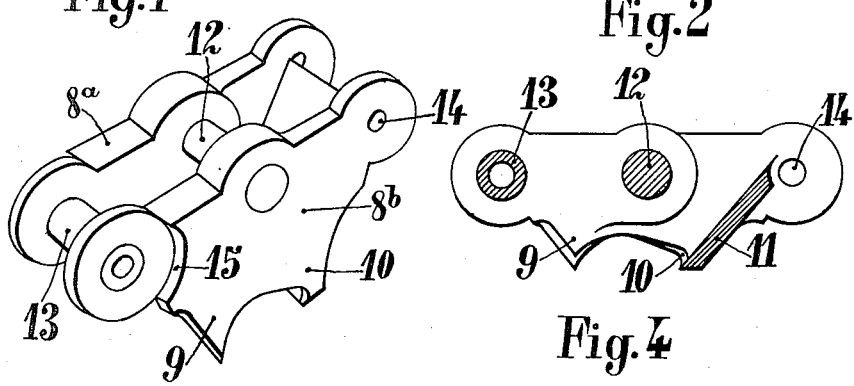

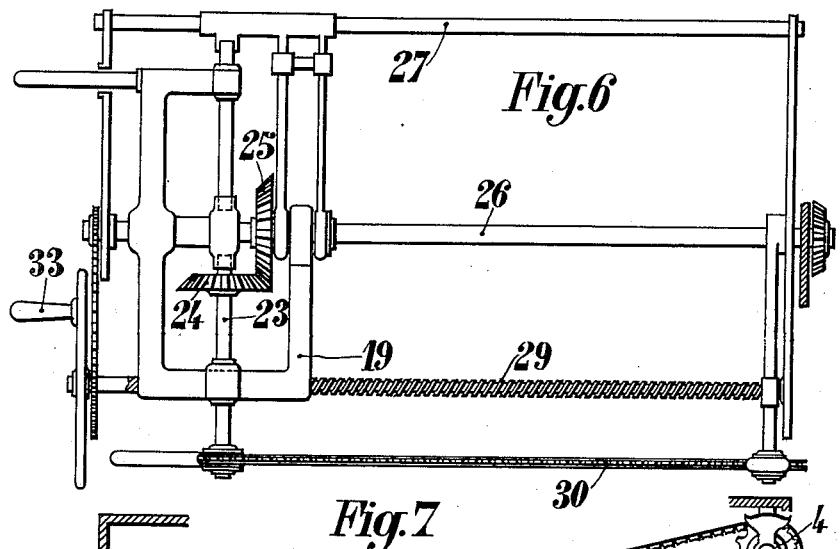
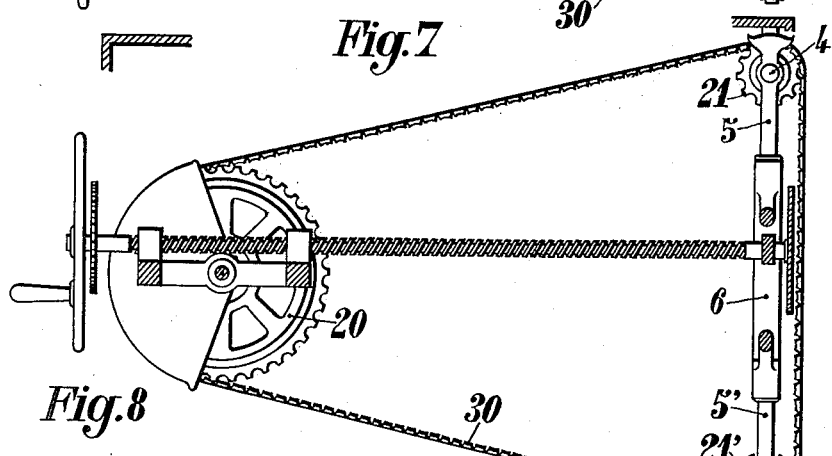
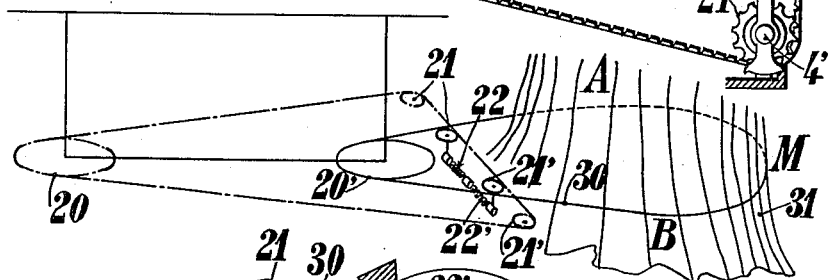
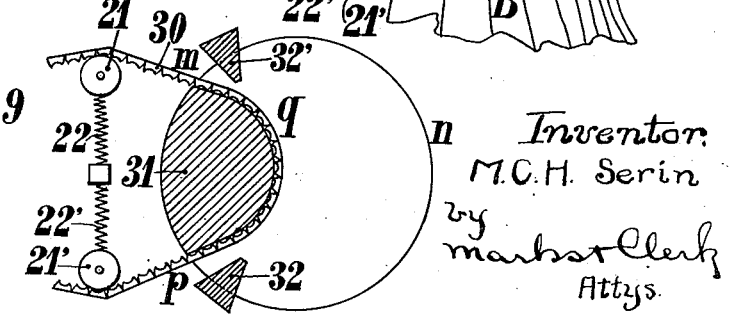

1,483,387

UNITED STATES PATENT OFFICE.

MAURICE CAMILLE HENRI SERIN, OF PARIS, FRANCE.

CHAIN-SAW MACHINE.

Application filed May 16, 1922. Serial No. 561,450.

*To all whom it may concern:*

Be it known that I, MAURICE CAMILLE HENRI SERIN, a citizen of the French Republic, residing 12 rue de la Banque, Paris, France, have invented new and useful Improvements in Chain-Saw Machines, of which the following is the specification.

This invention relates to improvements in mechanical chain saws having inwardly directed teeth.

Saws of this type already known are constituted essentially by links pivotally connected together, each having, on the one hand, two side cutting edges slightly inclined relatively to each other and, on the other hand, a third cutting edge at right angles to the line dividing the angle formed by the two first mentioned cutting edges. The endless chain constituted by the assemblage of such links embraces the tree to be felled and is driven by a driving wheel the special teeth of which allow it to gear with the chain without damaging the cutting edges. The advance of the saw is obtained by rectilinear displacement of the axis of the driving wheel in the plane of the said saw.

Such saws have the following disadvantages:

1. When the tree is completely cut, the saw escapes and becomes detached from the driving wheel, since it is no longer guided in the groove formed often resulting in serious accidents, the less important of which is the damaging of the saw.

2. The curvature of the saw cut constantly increases with the advance of the work with the result that:—

(a) At a certain stage, the curvature becomes so accentuated that the links abut on each other and "jamb" thereby checking the operation of the saw.

(b) The saw cuts into the wood at an angle which becomes more acute as the curvature further increases which is very disadvantageous to the proper operation of the saw.

The improvements forming the subject-matter of the present invention are designed to do away with these disadvantages.

The said improvements are primarily characterized in that the chain is guided by two loosely mounted rollers which are caused to rotate by the said chain, these rollers being connected by a resilient member which tends to move them apart, in a direction at right angles to the direction of advance of the driving wheel of the saw.

It is clearly evident from the following description and the accompanying drawing, how this arrangement avoids the disadvantages of the prior devices. However, it is to be noted from now that this arrangement imposes a condition of construction of the chain saw and driving wheel as well as of the guide rollers. In fact, the chain is driven relatively to the driving wheel, but it is a driving wheel relatively to the guide and tension rollers. It is therefore necessary for the wheel to gear exactly with the chain, that is to say that the teeth in gear of each wheel should be tangent on both faces with the corresponding gearing surfaces of the chain.

This condition is not present in any of the known chain saws having inwardly directed teeth, in which the chain cannot constitute a driving member, and the arrangements permitting to carry it out constitute an important part of the improvements in accordance with the invention.

These arrangements are characterized in that the links of the saw have two side cheeks connected by stays which form inner gearing surface with the driving or guide wheels, the teeth of which are enlarged at the base so as to form an abutment for the stays and to protect the cutting edges.

In the accompanying drawing:

Fig. 1 is a perspective view of a link of the chain saw.

Fig. 2 is a longitudinal section thereof.

Fig. 3 is a plan view of the same.

Fig. 4 is a partial section showing the method of gearing of the chain and of a wheel.

Fig. 5 is a similar view in elevation.

Fig. 6 is a side elevation of the sawing machine.

Fig. 7 is a horizontal section of the sawing machine.

Fig. 8 is a diagrammatic perspective view thereof.

Fig. 9 is a diagrammatic view showing the method of felling a tree.

Referring to the drawing in detail and more particularly to Figs. 6 to 9, the chain saw 30 is mounted on three wheels; the driving wheel 20 and the guide wheels 21 and 21'. The wheels 21 and 21' are each so mounted as to rotate loosely on the shafts 4 and 4', these shafts being respectively rigid with arms 5 and 5'. These arms are slidably mounted in corresponding bores of a frame 6 and are resiliently separated by springs 22 and 22' which constantly tend to space apart the wheels 21 and 21', so as to tension the chain saw 30.

As previously indicated, the wheel 20 drives the chain and the latter drives the wheels 21 and 21'. It is therefore necessary that the teeth of these various wheels, combined with the arrangement of the chain, permit the exact gearing, that is to say that the teeth in gear of each wheel should be tangent, on both faces, with the corresponding gearing surfaces of the chain.

For that purpose, the links of the chain saw are each constituted by two side cheeks $8^a$ and $8^b$, which have respectively two teeth 9 and 10. The teeth 10 are connected by a sharpened stay bar 11, so that three cutting edges are obtained; two side cutting edges 9 and the transverse cutting edge 11. These arrangements are known.

The two cheeks are, moreover, connected by a central cylindrical stay member 12 and, at one end, by a hollow stay member 13, of the same external diameter. At the other end, both cheeks are provided with holes 14 having a diameter equal to the internal diameter of the hollow stay member 13. On the other hand, at the end receiving this stay member 13 are provided external mortises 15; at the other end, are provided inner mortises 15'. In this manner, the successive links fit each other, a pin 16 passing through the holes 14 and the stay 13, so as to form a continuous chain. The stay members 12 and 13 are adapted to constitute the surfaces gearing with the wheels.

The teeth of the latter are arranged as illustrated in Fig. 4. The teeth 17 have at their bases enlargements $17^a$, $17^b$ which abut against the stay members 12 and 13 and thus permit the insertion of the cutting edge in the recesses of the teeth, whilst ensuring an exact gearing.

The wheel 20 is keyed on a shaft 23; this shaft is guided and supported by a frame 19 and receives its movement through a pair of bevel pinions 24—25 from the shaft 26. The frame 19 can slide, by driving the shaft 23 and the pair of bevel pinions 24—25, on the shaft 26; a guide rod 27, parallel to the shaft 26, ensures the correct guiding of the translation of the frame 19. The translation of the frame 19 is controlled by a screw 29 which is threaded in a part of said frame. The rotation of this screw can be controlled by hand by means of the crank 33.

The driving of the saw may be effected and controlled in any desired manner.

The operation of the saw is as follows:

For felling a standing tree, the plane of the wheels 20, 21 and 21' is caused to become horizontal or approximately horizontal. Then, by means of the screw 29, the wheel 20 is moved towards the wheels 21 and 21', thus slackening the chain, until the trunk can be surrounded by the chain. Once the trunk is surrounded, the wheel 20 is brought backward, until the chain is tensioned and is placed in one and the same plane. Then the engine is caused to operate, thereby driving the saw, and at the same time the operator, acting on the screw 29, constantly brings the wheel 20 backward; this movement can, however, be automatic.

It is obvious that, when the tree is completely sawed, the chain is entirely supported by the wheels 20, 21 and 21'.

On the other hand, in proportion as the work proceeds the operator moves the wheel 20 at such a speed that the tension exerted by the chain progressively diminishes; consequently, both wheels 21 and 21' move away from each other under the action of the spring 22, this having the effect of increasing the radius of curvature according to which the chain engages with the tree.

The inconvenience indicated at the beginning of this specification and relating to the use of chain saws are therefore by this means completely avoided.

Fig. 9 clearly shows that, when the tree is partially cut according to the space $m\ n\ p\ q$ (the portion with the hatchings indicating the portion which remains to be cut) it is possible to introduce in the slot wedges such as 32 and 32' permitting to cause the tree to fall in the required direction.

The device described can be used for cutting trees in logs, in the same manner as above, but after having caused the plane of the saw to turn of 90° about the driving shaft 26.

What I claim as my invention and desire to secure by Letters Patent is:

1. An endless chain saw having inwardly directed teeth, a driving sprocket within the chain, guide rollers yieldingly mounted in the plane of said sprocket tending to give the loop of the saw chain a generally triangular outline in combination with means for moving the driving sprocket towards and from the guide pulleys.

2. An endless chain saw having inwardly directed teeth, a driving sprocket within the chain, guide rollers yieldingly mounted in the plane of said sprocket tending to give the loop of the saw chain a generally triangular outline, in combination with means for moving the driving sprocket towards and from the guide pulleys, and a shaft parallel to the plane of said sprocket and a gear slidable on said shaft and driving said sprocket, this sprocket, guide pulleys and saw being rotatably mounted about said shaft to change the plane of cut of said saw.

In testimony whereof I have signed my name to this specification.

MAURICE CAMILLE HENRI SERIN.